Sept. 27, 1966 R. G. PANOCHYK 3,274,718

INFORMATION DISPLAY PANEL

Filed Dec. 28, 1964

Inventor
RALPH G. PANOCHYK
By Marvin M. Chaban
Attys.

3,274,718
Patented Sept. 27, 1966

3,274,718

INFORMATION DISPLAY PANEL

Ralph G. Panochyk, Grand Rapids, Mich., assignor to Automatic Canteen Company of America, Chicago, Ill., a corporation of Delaware Filed Dec. 28, 1964, Ser. No. 421,518
5 Claims. (Cl. 40—124)

The present invention relates in general to automatic phonographs and more particularly to apparatus for identifying the possible selections stored in the phonograph.

It is quite apparent that in automatic phonographs, there must be provided means of identifying the records to be selected, so that the prospective user or customer can be aware of all the selections available to him prior to making his choice. The record titles in the selection library are generally coded in a system to facilitate selection, the prevalent contemporary system generally numbering each record with a key number 1–10, and providing a letter for each group of ten records. The identifying number and letter of a position in the record library should be maintained, even as the particular record in a position is changed periodically to keep abreast of the changing popularity levels of popular music. In usual practice, record titles are typed or printed one or two to a card, and the cards are fitted in a panel or program holder adjacent the letter and number code identifying the position of the particular record in the record storage magazine. One current practice utilizes two titles per card, the titles on a particular card signifying the two sides of a particular record.

While the foregoing is, of course, well known to all who have viewed automatic phonographs or who have played selections on them, the means for displaying the record information and for changing it is not so readily apparent.

To review the conditions or criteria needed for a successful title or information indicia display of the type described, the title cards should be held firmly in place in a manner rendering them clearly visible to the prospective customer. The titles must be closely associated with the identifying number and letter for selection. The titles must be clearly legible, yet for a libary of up to 200 selections the title cards cannot be spread over an extended area. In addition to these basic conditions, it is important for servicing considerations that the title cards be easy to replace.

In order that the titles be clearly visible during use, the title cards should be flat in a transverse sense. To remove the cards, the card holder or panel should be remote or free from the retaining frame or back surface, in order that the cards can be readily freed from the card holding medium. In one method of changing titles, the holder panel is pivoted at the top, and the bottom edge is elevated from the rear supporting surface. Since the cards are slideable laterally out of their holding grooves, they can be freely grasped for manual removal. In another contemporary approach to this problem, the panel is removed completely from its rear surface mounting to allow the manual removal of the cards held in the panel. Other mechanisms have required that the serviceman release the panel and pivot or remove it entirely. He then manually holds the panel while cards are being removed and replaced. All the above-mentioned systems provide inexpensive means for changing title cards, but none provides the ease and simplicity afforded by the use of the present invention.

It is, therefore, an object of the invention to provide a new and improved panel construction for the display of information especially applicable for use on automatic phonographs.

It is a further object of the invention to provide an information panel for use on automatic phonographs, in which the information may be changed in a novel and simple fashion.

It is another object of the invention to provide novel information panel construction for use on automatic phonographs, in which the panel normally is held against a retaining surface, the panel is pivotal to an oblique position in which information-bearing cards are readily accessible for removal and replacement, and in which the panel is held in this oblique service position automatically until restored manually to its normal position.

To effect these and other objects, features, and advantages, the present invention provides a title and information card panel for use on an automatic phonograph in which the cards are normally held parallel to the retaining surface. The panel is held in this parallel or normal position by a three-point mounting. The three-point mounting includes three tabs or fingers extending through the retaining surface. Two of these tabs constitute a pivot line adjacent and parallel to one edge of the panel. The third tab is positioned adjacent the remote edge. A retaining spring mounted on the rear of the retaining surface abuts against a ridge on the third tab to hold the panel in the normal position.

To replace the cards in a panel, the panel edge adjacent the pivot line is depressed toward the retaining surface, and the remote edge is consequently moved away from the panel. The ridge on the third tab flexes the spring, and the ridge slides past the spring. The panel thus moves to a position in which the remote end of the panel is angled acutely from the retaining surface. The retaining spring abuts against a second ridge on the third tab to hold the panel in this angled position. In this position, the card holding grooves in the panel are angled from the retaining surface and are very accessible for servicing, removal, and replacement. At the conclusion of the replacement, the remote edge is depressed, the retaining spring yields, and the panel returns to its normal position with the retaining spring holding the panel generally flat against the retaining surface.

The invention both as to its method of operation together with other objects, features, and advantages thereof will best be understood when viewed in conjunction with the drawings in which.

Figures 1, 2, 3, 4, 5, 7:
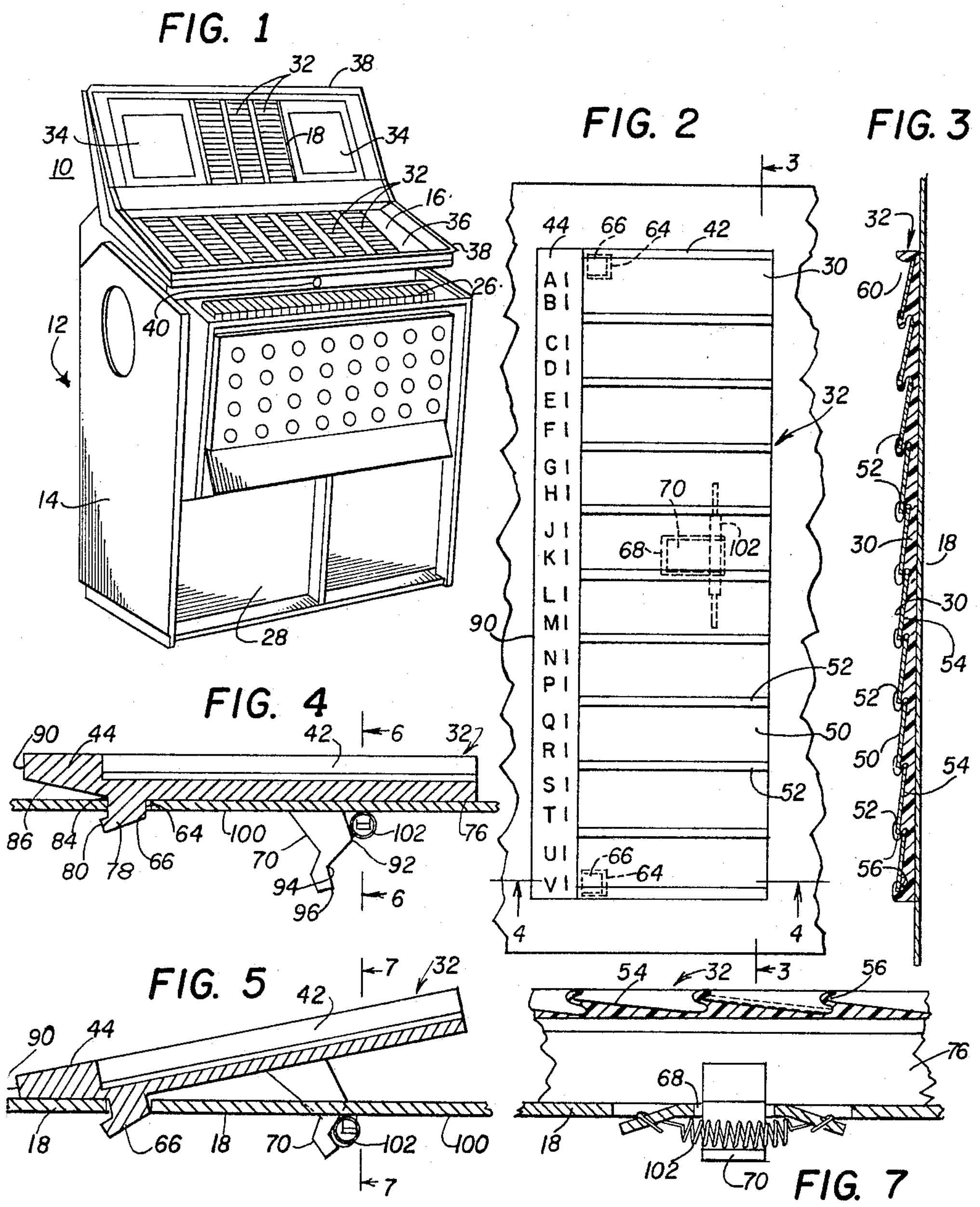
FIGURE 1 is a front view in perspective of a coin-operated, automatic phonograph employing the invention.
FIGURE 2 is a front view in elevation of the display panel portion of FIGURE 1.
FIGURE 3 is a sectional view taken along line 3—3 of FIGURE 2.
FIGURE 4 is a sectional view taken along line 4—4 of FIGURE 2.
FIGURE 5 is a sectional view as FIGURE 4 showing the panel in the inclined position for service.
FIGURE 7 is a partial sectional view taken along line 7—7 of FIGURE 5.

Now turning to the figures in detail, in FIGURE 1 there is shown a phonograph 10 of the coin-operated type capable of storing 200 records available for selection, encased in a walled cabinet 12. The cabinet 12 in its main or lower housing 14 is generally rectangular in section and is joined toward its upper extremity to a first indica-bearing surface 16 inclined at a shallow angle to the horizontal and a second indicia surface 18 extending almost vertically atop the cabinet. These surfaces are inclined for ready visibility on the part of the machine user and are positioned at heights as close to the eye level of an average user as can be advantageously designed.

The cabinet and housing have the conventional internal components (not shown) for coin-operated phonograph operation. Such components include a record storage magazine, a record playing turntable, means for moving selected records between the magazine and the turntable, sound amplifying apparatus, coin crediting systems, record selection mechanisms and all the generally known elements necessary to the operation of a phonograph of the type shown.

Records stored in the magazine (not shown) are coded as to location within the magazine, with each designation including a number and a letter. The number and letter designations are represented by individual depressible buttons or keys 26 aligned in a keyboard array along the housing front wall 28. Each combined number and letter designation is represented by a card 30 or portion of a card listing pertinent information such as the title of the recording and the name of the performing artist. The designation cards 30 are fitted in panels 32, mounted on indicia surfaces 16 and 18 of cabinet 12. These panels, ten in number, each represents a different one of the ten code numbers; and each panel lists twenty selections each represented by a different letter, in the embodiment shown. The panels 32 mounted on surface 18 are substantially vertically disposed, and the remaining panels mounted on surface 16 are inclined at a lesser angle to the horizontal, all disposed to be readily visible from the front of the phonograph housing and adjacent the selection keys 26. Various decorative elements 34, such as photographs of the performers or the like may be placed alongside some of the panels for visual design purposes. In the normal condition, one or more clear glass or plastic sheets 36 cover the panels, the sheets each resting within a frame 38 which may be lockable as indicated by lock 40. The frames may be pivoted with respect to the housing about hinges (not shown) along their upper edges to render the panels individually accessible for replacement of cards 30. The foregoing is conventional in the phonograph art and need not be detailed here.

The panels 32, which comprise the core of the invention, are substantially identical to the one shown best in FIGURES 2 and 3. The panels each mount closely adjacent one another on the indicia surfaces 16 and 18 of the cabinet 12. The surfaces 16 and 18 may be sheet metal, wood, suitable synthetic resins or other suitable construction materials. These surfaces are, as mentioned, adjacent the upper extremity of the housing such that the indicia on the cards borne by the panels may be easily read. The panels 32 are individually fabricated of sheet metal or suitable synthetic resin with a card-bearing area 42, a code designation area 44, and mounting means to be described.

The card-bearing area is comprised of a series of parallel, lateral slots 50. These slots 50 are defined at their top and bottom by raised divider strips 52 which extend from the juncture of raised code designation area 44 (at left in FIGURE 2) to a termination at the right edge of the panel 32. The slots 50 are open at the end remote from the designation area to allow indicia cards 30 to be slid out of the slot open ends and replaced readily. The raised juncture line of area 44 serves as a stop and resting place for one end of a card when the card 30 is inserted in the slot 50. Within each of the slots 50, the back card holder wall 54 is inclined slightly from the vertical to place respective cards in individual planes easing the grasping of a card and positioning the cards for greater readability. Each divider strip 52 has a groove 56 at its juncture to wall 54 to hold each individual card firmly against wall 54.

Each card 30 may in one form have two titles marked thereon to indicate the position of two records. See FIGURE 2. For each such card, the code designation area 44 has listed the coded symbol or designation, such as codes A1 and B1, next to the respective titles in one card 30 in the uppermost slot 60. These code designations are permanently printed or otherwise marked visibly in the raised code designation area 44 of a panel to indicate the position and designation of each recording.

Each panel is mounted on the indicia surface 16 or 18 as shown best in FIGURES 4–7 for surface 18. The surface 18 has three rectangular cutouts extending through the surface for receiving the panel mounting means, two of these cutouts 64 for receiving hinge members 66 and the remaining cutout 68 for receiving holding finger 70.

The hinge cutouts 64 are spaced inwardly of the upper and lower edges of panel 32 behind the card-bearing area adjacent to the line of juncture between the card-bearing area 42 and the code designation area 44. The remaining cutout 68 is centrally located in a vertical sense near the remote end of the panel which is adjacent the open slot ends.

Affixed to the back wall 76 of panel 32 and extending therefrom are the two hinge members 66 and the single hold finger 70. The two hinge members 66 are dimensionally of cross-section slightly smaller than the dimensions of cutouts 64, and the hinge members are positioned to fit through these cutouts. Each hinge member 66 comprises a shank 78 projecting substantially normally from wall 76 into a tip 80 offset angularly from the shank to form an acute angle with section 86 of wall 76 at the code designation end of the panel.

When panel 32 is mounted on surface 18 with its back wall 76 flush against surface 18 (as shown in FIGURE 4), the shank 78 of hinge member 66 extends through cutouts 64 with offset tip 80 resting behind the surface 18. The rear surface 76 of panel 32 includes a flat wall portion behind the card-bearing area, this flat portion normally being held flush against surface 18. The wall portion 86 is angled acutely from surface 18 on the other side of the pivot line 84 at the hinge members 66, as indicated in FIGURES 4 and 5. With the construction set out, the panel 32 may be pivoted from the flush or normal position of FIGURE 4 to the service or inclined position of FIGURE 5 by depressing the flap member 90 formed by the code designation area 44 and sloping wall 86. In the inclined or service position shown in FIGURE 5, the sloping wall 86 is flush against the surface 18, and the remainder of the rear wall 76 at its remote end is inclined acutely from surface 18.

To hold the panel 32 in either of these two positions, there is provided the hold finger 70. Finger 70 is somewhat sigmoid in shape with a first ridge 92 extending toward the free end of the panel. Further, along the same side of the finger, there is a valley 94 and at the outermost tip of finger 70 a second ridge 96. In the position of FIGURE 4, the finger 70 protrudes through the cutout 68 in surface 18.

Mounted on rear wall 100 of surface 18 is a helical tension spring 102. The ends 104 of this spring are hooked onto prongs 106 such that the spring overlies the portion of cutout 68, and the spring central axis is parallel to pivot line 84 along the side of the cutout 86 adjacent the free or remote end of the panel. Prongs 106 may be formed from surface 18 and obliquely directed as shown in FIGURES 6 and 7.

Figure 6:
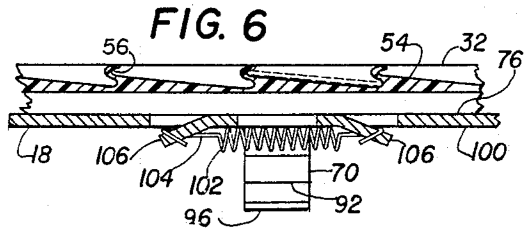
FIGURE 6 is a partial sectional view taken along line 6—6 of FIGURE 4.

With the panel in the normal position of FIGURES 4 and 6, the spring 102 abuts against ridge 92 and holds the main portion of wall 76 flush against the surface 18 along with the hinge members 66. To service the panel, pressure is exerted on the flap member 90, and spring 102 yields to the force transmitted to ridge 92 and allows the ridge 92 to pass the spring and pass through cutout 68. The panel pivots about pivot line 84 to the position of FIGURES 5 and 7.

In the position of FIGURES 5 and 7, the spring 102 rests in valley 94 and butts against the second ridge 96 to hold the panel with sloping wall 86 flush against surface 18. The tips 80 of hinge members 66 also aid in maintaining the panel in the oblique or service position. The cards 30 and their grooves are inclined from surface 18, and the cards may readily be slid out the open ends of the slots and replaced as desired.

To remove a panel entirely, the end of the panel remote from the hinge members is grasped and the second ridge 96 is drawn past spring 102 extending it until the engagement of spring 102 and ridge 96 is freed. The panel is drawn substantially normal to surface 18 until hinge members 66 are freed of their engagement with cutouts 64. This latter movement frees the panel of all engagement with surface 18.

When the new cards and/or panels have been inserted, the panels are returned to their normal positions flush against the respective indicia surfaces 16 and 18, and frames 38 are closed and locked to cover the panels with cover sheets 36. With the cover frames and sheets in place, the panels are inaccessible and cannot be removed while they are clearly visible to the eye of the viewer.

Thus, there has been shown indicia bearing members which may be serviced and removed easily without the use of any tools. The members are normally held firmly in position for ready visibility. The members may be moved individually to a service position manually in a simple tape requiring the use of no tools. The members are individually held automatically in the service position while the servicing takes place. The members may then be restored, or if need be removed, again without the need for tools of any kind. Following removal, the member or members may be replaced with a minimum of effort, again requiring the use of no tools.

While there has been described what is at present thought to be a preferred embodiment of the invention, it will be understood that modifications may be made therein and it is intended to cover in the appended claims all such modifications as fall within the true spirit and scope of the invention.

What is claimed is:

1. Indicia structure for an automatic phonograph comprising:
(a) a mounting surface,
(b) an indicia panel pivotally mounted on said surface,
(c) means pivoting said panel on said surface adjacent one end of said panel,
(d) a plurality of parallel grooves in said panel,
(1) said grooves open at the end of the panel remote from said pivotal mounting,
(e) a flap member extending beyond the pivoting means at said one panel end,
(1) said flap member angled with respect to said surface when said panel remote end is resting against said frame, and
(f) means responsive to depression of said flap member for releasing said remote end for movement to a position angled from said surface wherein said grooves are angled from said surface.

2. An indicia holder for an automatic phonograph comprising:
(a) a mounting surface, (b) an indicia panel pivotally mounted on said surface,
(c) means pivoting said panel on said surface adjacent one end of said panel,
(d) a plurality of parallel grooves in said panel,
(1) said grooves open at the end of the panel remote from said pivotal mounting,
(e) a flap member extending beyond the pivoting means a said one panel end,
(1) said flap member angled with respect to said surface, when said remote end is resting against surface,
(f) means holding said panel against said surface, and
(g) means responsive to depression of said flap member for releasing said holding means to permit movement of said panel remote end toward a position angled from said surface wherein said grooves are angled from said surface.

3. An indicia holder for an automatic phonograph comprising:
(a) a mounting surface,
(b) an indicia panel pivotally mounted on said surface,
(c) means pivoting said panel on said surface adjacent one end of said panel,
(d) a plurality of parallel grooves in said panel,
(1) said grooves open at the end of the panel remote from said pivotal mounting,
(e) means acting on said panel to hold said panel remote end against said surface, and
(f) means responsive to outward pressure on said remote end for overcoming said hold means to release said remote end for movement of said panel remote end to a position angled from said surface,
(g) said holding means operative in said angled position to hold said panel remote end at an acute angle away from said surface.

4. A title listing holder for an automatic phonograph comprising:
(a) a mounting surface,
(b) a title listing panel pivotally mounted on said surface,
(c) means pivoting said panel on said surface adjacent one end of said panel,
(d) a plurality of parallel grooves in said panel,
(1) said grooves open at the end of the panel remote from said pivotal mounting,
(e) a bent finger extending from a connection to said panel through said surface,
(1) a first ridge on said finger,
(2) a second ridge on said finger positioned more remotely from said panel than said first ridge,
(f) a retaining spring mounted on said surface to rest against said first ridge and hold said panel remote end against said surface,
(g) said spring responsive to outward pressure on said remote end to release said first ridge and rest against said second ridge and hold said panel remote end at an acute angle outwardly of said surface.

5. A title listing holder for an automatic phonograph comprising:
(a) a mounting surface,
(b) a title listing panel pivotally mounted on said surface,
(c) means pivoting said panel on said surface adjacent one end of said panel,
(d) a plurality of parallel grooves in said panel,
(1) said grooves open at the end of the panel remote from said pivotal mounting,
(e) a flap member extending beyond the pivoting means at said one panel end,
(1) said flap member angled with respect to said surface when said remote end is resting against said surface,
(f) a bent finger extending from a connection to said panel through said surface, (1) a first ridge on said finger, (2) a second ridge on said finger positioned more remotely from said panel than said first ridge, (g) a retaining spring mounted on said surface to rest against said first ridge and hold said panel remote end against said surface, (h) said spring responsive to outward pressure on said remote end to release said first ridge and rest against said second ridge and hold said panel remote end at an acute angle outwardly of said surface.

References Cited by the Examiner

UNITED STATES PATENTS

| | | | |
|---|---|---|---|
| 737,478 | 8/1903 | Rand | 40—64 |
| 1,767,980 | 6/1930 | Hintze | 40—124 X |
| 1,834,423 | 12/1931 | Rider | 40—63 |
| 2,187,327 | 1/1931 | Novak et al. | 40—64 X |
| 2,713,738 | 7/1965 | Harman | 40—64 |

EUGENE R. CAPOZIO, *Primary Examiner.*

W. J. CONTRERAS, *Assistant Examiner.*